United States Patent
Kidambi et al.

(10) Patent No.: US 8,491,712 B2
(45) Date of Patent: Jul. 23, 2013

(54) DEHYDRATION SYSTEMS AND METHODS FOR REMOVING WATER FROM A GAS

(75) Inventors: Ganesh Prasadh Kidambi, Gudalur-Nilgiris (IN); Sachin Naphad, Katy, TX (US); Rajesh Vaddi, Bangalore (IN)

(73) Assignee: General Electric Company, Schenectady, NY (US)

(*) Notice: Subject to any disclaimer, the term of this patent is extended or adjusted under 35 U.S.C. 154(b) by 32 days.

(21) Appl. No.: 12/880,576

(22) Filed: Sep. 13, 2010

(65) Prior Publication Data

US 2012/0060690 A1    Mar. 15, 2012

(51) Int. Cl.
*B01D 53/14* (2006.01)

(52) U.S. Cl.
USPC .......... 96/234; 95/161; 95/163; 95/231; 95/236

(58) Field of Classification Search
None
See application file for complete search history.

(56) References Cited

U.S. PATENT DOCUMENTS

| | | | | |
|---|---|---|---|---|
| 3,563,696 A * | 2/1971 | Benson | | 23/223 |
| 4,009,083 A * | 2/1977 | Lyon et al. | | 203/49 |
| 4,010,009 A * | 3/1977 | Moyer | | 95/194 |
| 4,254,094 A * | 3/1981 | Hegarty | | 423/658.3 |
| 4,280,867 A | 7/1981 | Hodgson | | |
| 4,332,643 A | 6/1982 | Reid | | |
| 4,490,985 A | 1/1985 | Wells | | |
| 5,145,658 A * | 9/1992 | Chao | | 423/232 |
| 5,346,537 A * | 9/1994 | Lowell | | 95/161 |
| 5,490,873 A * | 2/1996 | Behrens et al. | | 95/160 |
| 5,501,776 A | 3/1996 | Lermite et al. | | |
| 5,725,636 A | 3/1998 | Gavlin et al. | | |
| 5,725,637 A | 3/1998 | Gavlin et al. | | |
| 5,766,423 A * | 6/1998 | Smith | | 203/12 |
| 5,817,889 A | 10/1998 | Pondebat et al. | | |
| 5,853,458 A | 12/1998 | Gavlin et al. | | |
| 5,922,109 A | 7/1999 | Rooney et al. | | |
| 6,004,380 A * | 12/1999 | Landreau et al. | | 95/174 |
| 6,080,280 A | 6/2000 | Moore, Jr. | | |
| 6,177,597 B1 | 1/2001 | Gavlin et al. | | |
| 6,251,166 B1 * | 6/2001 | Anderson | | 95/166 |
| 6,375,806 B1 * | 4/2002 | Hicks | | 203/18 |
| 6,461,413 B1 | 10/2002 | Landreau et al. | | |
| 6,699,308 B1 | 3/2004 | Nilsen et al. | | |
| 6,789,288 B2 | 9/2004 | Wijmans et al. | | |
| 6,896,718 B2 | 5/2005 | Hallman | | |
| 2004/0206242 A1 | 10/2004 | Wijmans et al. | | |
| 2006/0123993 A1 | 6/2006 | Henriksen | | |
| 2006/0150812 A1 * | 7/2006 | Mak et al. | | 95/199 |

(Continued)

OTHER PUBLICATIONS

Lars Erik and Elisabeth Tyvand Selsto, "Process Simulation of Glycol Regeneration," as presented at GPA Europe's meeting in Bergen on May 13-14, 2002 (pp. 1-11).*

*Primary Examiner* — Duane Smith
*Assistant Examiner* — Pankti Patel
(74) *Attorney, Agent, or Firm* — Armstrong Teasdale LLP

(57) ABSTRACT

A dehydration system is provided. The dehydration system includes an absorber configured to produce a dry gas and a rich solvent from a wet gas and from a pure solvent and a flash drum coupled in flow communication with the absorber for receiving the rich solvent discharged from the absorber. The flash drum is configured to produce flash gas from the rich solvent. The dehydration further includes a reboiler configured to produce a semi-lean solvent from the rich solvent and an inert gas system configured to strip the semi-lean solvent using at least the flash gas to produce the pure solvent.

8 Claims, 3 Drawing Sheets

U.S. PATENT DOCUMENTS

2009/0235820 A1 9/2009 Carugati et al.
2010/0111784 A1* 5/2010 Mak et al. .................... 422/190
2010/0281775 A1* 11/2010 Logue .......................... 48/127.3
2011/0088553 A1* 4/2011 Woodhouse et al. ........... 95/162

* cited by examiner

DEHYDRATION SYSTEMS AND METHODS FOR REMOVING WATER FROM A GAS

BACKGROUND OF THE INVENTION

The embodiments described herein relate generally to a gas dehydration system and, more particularly, to a sub-system within a gas dehydration system in which water is removed from a solvent.

At least some known integrated gasification combined cycle (IGCC) systems produce carbon dioxide ($CO_2$) while producing synthesis gas, or "syngas." The $CO_2$ produced by the IGCC system can be captured to reduce emissions from the IGCC system. In known IGCC systems, the captured $CO_2$ is typically compressed and dehydrated to meet downstream specifications. A key specification value is the water content of the captured $CO_2$.

Dehydration of natural gas from reservoirs has been performed during gas processing using, for example, triethylene glycol (TEG) or diethylene glycol (DEG), as a solvent. In such systems, the solvent must be dehydrated prior to being re-used in the natural gas dehydration system because the water-laden solvent does not efficiently remove water from the natural gas. As the purity of a solvent increases, the dehydration capacity of the solvent also increases. As used herein, the term "purity," as it relates to a solvent, refers to an amount of water in the solvent and/or a concentration of the solvent by percent (%) weight. As the purity of the solvent increases, the water concentration of the solvent decreases. Conversely, as the purity of the solvent decreases, the water concentration of the solvent increases.

In at least one known $CO_2$ dehydration system in an IGCC system, dried $CO_2$ is channeled from a gas exit knock-out drum into a Stahl column (gas stripping column) to dry a solvent. A dried solvent produced using the dry $CO_2$ is usually greater than about 99.0% pure. However, the dry $CO_2$ is a valuable product stream, and using the dry $CO_2$ to dry the solvent may reduce the percentage capture of the $CO_2$ dehydration system.

BRIEF DESCRIPTION OF THE INVENTION

In one aspect, a dehydration system is provided. The dehydration system includes an absorber configured to produce a dry gas and a rich solvent from a wet gas and from a pure solvent and a flash drum coupled in flow communication with the absorber for receiving the rich solvent discharged from the absorber. The flash drum is configured to produce flash gas from the rich solvent. The dehydration further includes a reboiler configured to produce a semi-lean solvent from the rich solvent and an inert gas system configured to strip the semi-lean solvent using at least the flash gas to produce the pure solvent.

In another aspect, an inert gas system for use with a dehydration system is provided. The inert gas system includes a stripper configured to produce a stripped solvent from at least a rich solvent and flash gas, wherein the flash gas and the rich solvent are produced in a flash drum, a mixer configured to receive at least the flash gas, a reboiler configured to heat the stripped solvent to produce a semi-lean solvent, and a contacting device coupled to flow communication with the mixer and the reboiler. The contacting device is configured to contact the semi-lean solvent from the reboiler with at least the flash gas from the mixer.

In yet another aspect, a method for removing water from a gas using a solvent is provided. The method includes channeling the gas with the water into an absorber, channeling a pure solvent into the absorber, and contacting the pure solvent and the gas including the water to produce a rich solvent and a dry gas. The method further includes channeling the rich solvent to a flash drum to produce a flash gas, heating the rich solvent to produce a semi-lean solvent, and contacting at least flash gas from the flash drum with the semi-lean solvent to produce the pure solvent.

DETAILED DESCRIPTION OF THE INVENTION

Figure 1:
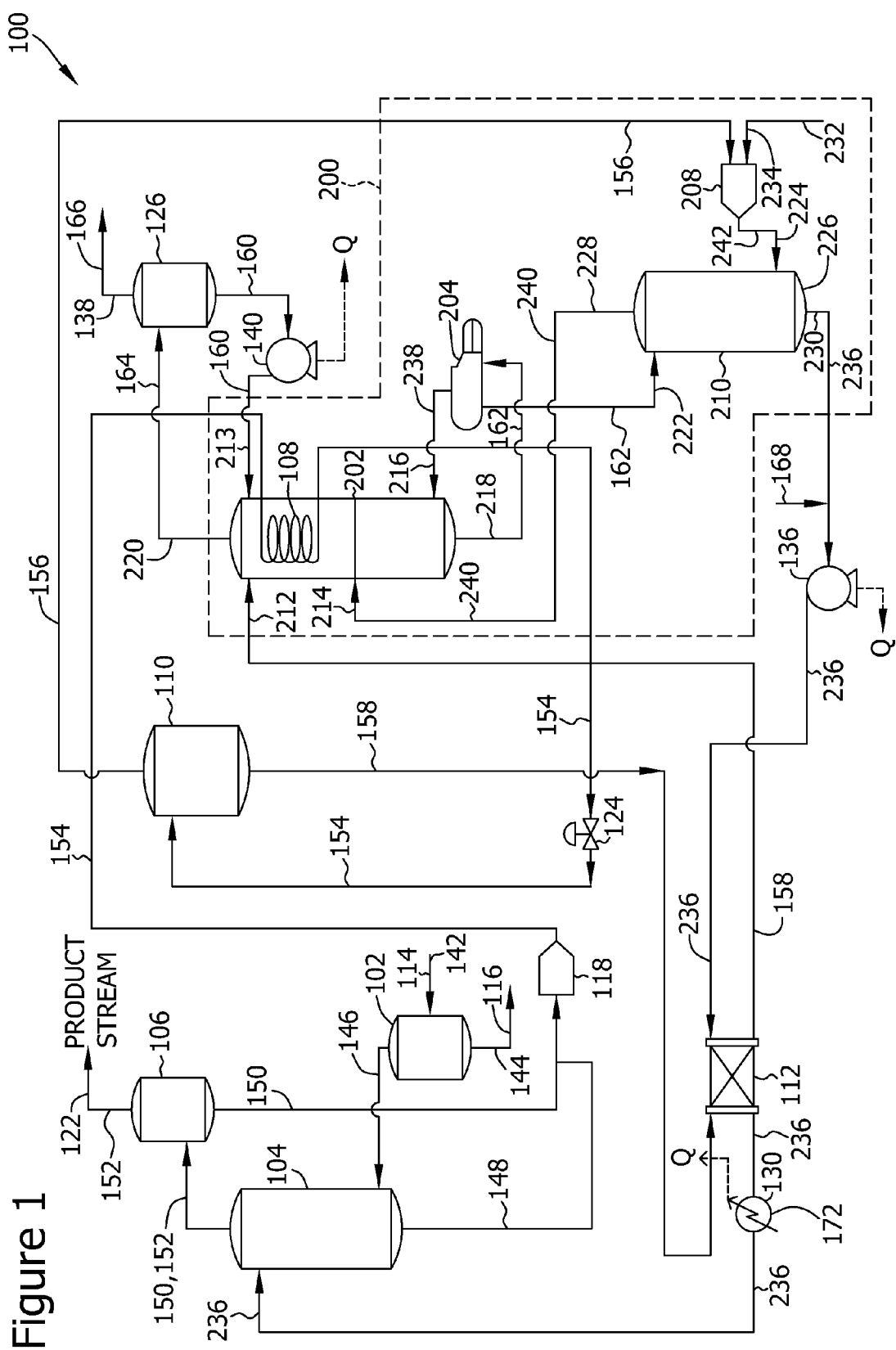
FIG. 1 is a schematic view of an exemplary dehydration system.

The embodiments described herein bring captured carbon dioxide ($CO_2$) into contact with a solvent (also known as a liquid desiccant), such as triethylene glycol (TEG) and/or diethylene glycol (DEG), and flash the solvent to remove any soluble $CO_2$. More specifically, a rich solvent is produced when the CO2 is dried, and then the rich solvent is used to produce flash gas and a semi-lean solvent. The semi-lean solvent passes through a stripper system to generate a lean solvent. As used herein, the terms "wet" and/or "rich" refer to a compound that includes less than about 2% water, and the terms "dry" and/or "lean" refer to a gas and/or a compound that includes less than about 1% water. Further, as used herein, the term "semi-lean" refers to a compound that has less water than a wet or rich compound but more water than a dry or lean compound. Moreover, as used herein, the terms "concentration," "pure," "purity," and/or variations thereof refer to a compound having less water than a dry and/or lean compound. Additionally, any mixer referred to herein can be a static mixer or an inline mixer. Also, although "water" and/or "steam" are referred to herein, it should be understood that a "water" and/or "steam" stream can include more than one phase of $H_2O$. For example, a "steam" stream can include some water. As such, the terms "water" and/or "steam" as used herein refer to the compound $H_2O$.

A typical concentration of glycol achieved at atmospheric conditions is about 99.0% by weight because glycol degrades at temperatures above approximately 400 degrees Fahrenheit (° F.). To further enhance the concentration of the glycol, a subsequent column of gas stripping is used. The embodiments described herein use an inert gas and/or flash gas to strip the glycol to desired conditions, such as to a concentration or purity of more than about 99.0%. More specifically, in one embodiment, the flash gas from a low-pressure (LP) flash drum is used, either alone or in combination with an inert gas, such as LP nitrogen supplied from an ASU (air separation unit), a tail gas from a tail gas treatment system, clean syngas from a gas processing unit and/or sour syngas from a gas cooling system, to increase the concentration of the solvent. Further, inline mixing and flashing can also be used to increase the concentration of the solvent.

The dehydration systems described herein include an absorber in which incoming wet $CO_2$ is contacted with the solvent to dry the $CO_2$. The solvent is then heated in a reflux coil by stripper overhead gas and is then channeled to a flash drum wherein any soluble $CO_2$ is removed from the solvent to produce flash gas and rich solvent. This rich solvent is then heated with lean solvent discharged from the stripping column prior to being channeled to the stripper. The rich solvent discharged from the stripper is at a maximum concentration of about 99.0% by weight at approximately 1 atmospheric pressure (atm). However, to achieve, for example, 100 PPMV for the dry $CO_2$, the concentration of the solvent should be above about 99.0%. For example, a solvent concentration of approximately 99.7% is used at an absorber pressure of about 300 pounds per square inch absolute (psia) absorber pressure, and a solvent concentration of approximately 99.3% is used at an absorber pressure of about 700 psia.

To achieve a solvent concentration above approximately 99.0%, the rich solvent is heated to produce a semi-lean solvent, and an external inert gas and/or a flash gas is used in a gas stripping column to produce a lean solvent from the semi-lean solvent. In one embodiment, a concentration of approximately 99.7% solvent by weight is achieved by mixing LP nitrogen, for example nitrogen discharged from an air separation unit (ASU), with flash gas discharged from a flash drum, and contacting the mixture with the semi-lean solvent. The LP nitrogen and/or the flash gas is used as stripping gas in a Stahl column. Additionally or alternatively, tail gas that is recycled from a tail gas unit and/or a stream of clean syngas and/or sour syngas is used as the stripping gas in the Stahl column. Further, a pure solvent entering the absorber can be passed through a coil inside a vessel attached to the Stahl column before being channeled to an absorber. The inert gas and/or flash gas being channeled into the stripper first passes through the vessel, which heats the solvent, and then proceeds into the Stahl column.

In an alternative embodiment, the flash gas and the inert gas are mixed and then injected into a last stage of the stripper to produce a solvent concentration as high as approximately 99.6% by weight. In still another embodiment, a mixer mixes the flash gas, the inert gas, and/or a semi-lean solvent. The semi-lean solvent is produced in the stripper. The mixture is then flashed at atmospheric pressure to produce a solvent having a concentration of approximately 99.4% by weight. When an inert gas, such as the nitrogen, is mixed with the flash gas, the inert gas is used to cool a pure solvent being channeled to an absorber to about 90° F. before the inert gas is mixed with the flash gas.

FIG. 1 is a schematic view of an exemplary dehydration system 100. Dehydration system 100 is configured to produce about 99.7% pure solvent for re-use. In the exemplary embodiment, dehydration system 100 includes a gas inlet knock-out (KO) drum 102, an absorber 104, a gas exit KO drum 106, a reflux coil 108, a flash drum 110, a heat exchanger 112, and an inert gas system 200. Gas inlet KO drum 102 is coupled in flow communication with a gas inlet 114, absorber 104 and a water discharge 116, and absorber 104 is coupled in flow communication with gas exit KO drum 106, a first mixer 118, and a solvent cooler 130. Gas exit KO drum 106 is coupled in flow communication with a gas discharge 122 and first mixer 118. First mixer 118 is coupled in flow communication with reflux coil 108. Reflux coil 108 is coupled in flow communication with a solvent pressure control device 124, such as a valve and/or a hydroexpander. Reflux coil 108 is configured to heat a rich solvent to just below its decomposition temperature. Pressure control device 124 is coupled in flow communication with flash drum 110, which is coupled in flow communication with heat exchanger 112 and inert gas system 200. Heat exchanger 112 is coupled in flow communication with inert gas system 200, a solvent pump 136, and solvent cooler 130.

Inert gas system 200 includes components, described in more detail below, that are in flow communication with a vessel 126, flash drum 110, solvent pump 136, and heat exchanger 112. Solvent pump 136 is coupled in flow communication between inert gas system 200 and heat exchanger 112. Cooler 130 is coupled in flow communication with heat exchanger 112 and absorber 104. Further, vessel 126 is coupled in flow communication with a discharge 138 and a pump 140. More specifically, any liquid collected in vessel 126 is channeled to inert gas system 200 via pump 140.

In the exemplary embodiment, inert gas system 200 includes a stripper 202, a reboiler 204, a second mixer 208, and a Stahl column 210. Reflux coil 108 is within stripper 202. Stripper 202 includes a plurality of inlets 212, 213, 214, and 216 and a plurality of outlets 218 and 220. Inlet 212 is coupled in flow communication with heat exchanger 112, inlet 213 is coupled in flow communication with pump 140, inlet 214 is coupled in flow communication with Stahl column 210, and inlet 216 is in flow communication with reboiler 204. A solvent outlet 218 is coupled in flow communication with reboiler 204, and a gas outlet 220 is coupled in flow communication with vessel 126. Reboiler 204 is in flow communication with Stahl column 210, which is considered to be contacting device. Stahl column 210 includes a plurality of inlets 222 and 224, a plurality of outlets 228 and 230, and a vessel 226. Inlet 222 is coupled in flow communication with reboiler 204, and inlet 224 is coupled in flow communication with second mixer 208.

At a gas outlet 228, Stahl column 210 is coupled in flow communication with inlet 214 of stripper 202 and, at a solvent outlet 230, Stahl column 210 includes vessel 226. Within vessel 226, solvent passed through a coil and exchanges heat with a gas coming into vessel 226. Alternatively, Stahl column 210 does not include vessel 226. In the exemplary embodiment, vessel 226 is coupled in flow communication with pump 136 and second mixer 208. Second mixer 208 is coupled in flow communication with flash drum 110 and an inert gas inlet 232. Alternatively, an inert gas 234 is injected into reboiler 204. In the exemplary embodiment, inert gas inlet 232 is configured to supply inert gas 234 into second mixer 208. Inert gas 234 can be, without limitation, nitrogen, tail gas, clean syngas, and/or sour syngas. When inert gas 234 is nitrogen, inert gas 234 can be channeled to second mixer 208 from an air separation unit (ASU). The tail gas can be channeled from a tail gas treatment unit, and the syngas can be channeled from a gas clean-up system and/or a gas cooling system.

During operation of dehydration system 100, gas inlet KO drum 102 receives wet $CO_2$ 142 into dehydration system 100 via gas inlet 114. Gas inlet KO drum 102 removes at least some water droplets 144 from wet $CO_2$ 142 to produce wet $CO_2$ 146. Wet $CO_2$ 146 enters absorber 104 and mixes with cooled, pure solvent 236. Wet solvent 148, carry-over solvent 150, and dry $CO_2$ 152 are produced within absorber 104. Wet solvent 148 is channeled from absorber 104 to first mixer 118, and carry-over solvent 150 and dry $CO_2$ 152 are channeled from absorber 104 to gas exit KO drum 106. Within gas exit KO drum 106, dry $CO_2$ 152 is separated from carry-over solvent 150 and discharged from dehydration system 100 as a product stream. Carry-over solvent 150 is channeled from gas exit KO drum 106 to first mixer 118. In the exemplary embodiment, wet solvent 148 and/or carry-over solvent 150 includes $CO_2$.

Any solvent 150 carried over from absorber 104 is knocked out in drum 106 and mixed with rich solvent 148 from absorber 104 within first mixer 118. Rich solvent 154 is discharged from first mixer 118. Rich solvent 154 is channeled to reflux coil 108 to be heated. Heated rich solvent 154 is discharged from reflux coil 108 into pressure control device 124. Pressure control device 124 is configured to reduce a pressure of heated rich solvent 154 to generate LP rich solvent 154. In a particular embodiment, the pressure of heated rich solvent 154 is decreased from about 800 psia to between about 20 psia and about 90 psia. LP rich solvent 154 is then channeled into flash drum 110.

Flash drum 110 separates gaseous $CO_2$ rich stream from the liquid solvent and discharges the gaseous $CO_2$ rich stream as flash gas 156. The liquid solvent is discharged as flashed rich solvent 158. Flash gas 156 is channeled to second mixer 208, and flashed rich solvent 158 is channeled to heat exchanger 112. From heat exchanger 112, heated flashed rich solvent 158 is channeled to stripper 202. Vapor-liquid mixture 238, overhead 240, and liquid reflux 160 are channeled into stripper 202 to remove water from flashed rich solvent 158 to produce a stripped solvent 162. More specifically, vapor-liquid mixture 238 is channeled from reboiler 204 into stripper 202, overhead 240 is channeled from Stahl column 210 to stripper 202, and reflux 160 is channeled from vessel 126 into stripper 202. Vapor-liquid mixture 238, overhead 240, and reflux 160 produce stripped solvent 162 from heated flashed rich solvent 158. In one embodiment, stripped solvent 162 is about 99.0% pure. Stripped solvent 162 is discharged into reboiler 204 to be heated before being channeled to Stahl column 210. More specifically, reboiler 204 produces a semi-lean solvent 163 from stripped solvent 162 by heating stripped solvent 162.

In the exemplary embodiment, overhead gasses 164 from stripper 202 are cooled by solvent 154 in reflux coil 108 and channeled to vessel 126. Stripper-off gas 166 is discharged from a top of vessel 126 and reflux 160 is discharged from a bottom of vessel 126. In one embodiment, reflux 160 is a liquid that has been carried over by gases entering vessel 126. Reflux 160 is channeled to pump 140 for circulation through inert gas system 200.

Stahl column overhead 240 is produced from inert gas 234 and flash gas 156 used in Stahl column 210 and/or steam by-product generated in Stahl column 210. More specifically, flash gas 156 and inert gas 234 are channeled to second mixer 208 and combined therein. Alternatively, inert gas 234 and flash gas 156 are channeled into Stahl column 210 without prior mixing. In the exemplary embodiment, combined gas 242 is channeled through vessel 226 into a bottom of Stahl column 210 to remove water from semi-lean solvent 163 to produce pure solvent 236. In the exemplary embodiment, pure solvent 236 is about 99.5% pure to about 99.7% pure. Overhead 240 is channeled into stripper 202 for use in stripper 202 as described above. Within vessel 226, heat is exchanged from pure solvent 236 to flash gas 156 and/or inert gas 234. From vessel 226, pure solvent 236 is channeled to pump 136. A make-up stream 168 of pure solvent can be added to pure solvent 236 before pure solvent 236 enters pump 136.

Pure solvent 236 enters solvent pump 136 where pure solvent 236 is channeled to heat exchanger 112 to be cooled. More specifically, heat exchanger 112 heats solvent 158 from flash drum 110 using pure solvent 236. Pure solvent 236 is then further cooled in cooler 130. More specifically, a cooling fluid 172, such as, but not limited to, inert gas 234 discharged into Stahl column 210 or cooling water, is channeled through cooler 130 to cool pure solvent 236. Pure solvent 236 is then channeled into absorber 104.

In other words, dehydration system 100 includes absorber 104 that produces dry gas 152 and a rich solvent 154 from wet gas 146 and pure solvent 236, flash drum 110 coupled in flow communication with absorber 104 for receiving rich solvent 154, and inert gas system 200 that strips flashed rich solvent 158 using at least flash gas 156. Flash drum 110 produces flash gas 156 and flashed rich solvent 158 from rich solvent 154. Dehydration system 100 further includes reflux coil 108 coupled in flow communication between absorber 104 and flash drum 110. Reflux coil 108 heats rich solvent 154 with stripper overhead gas 164. Pressure control device 124 is coupled in flow communication between absorber 104 and flash drum 110 to reduce a pressure of rich solvent 154 before rich solvent 154 enters flash drum 110. Heat exchanger 112 heats flashed rich solvent 158 using pure solvent 236.

In the exemplary embodiment, inert gas system 200 is alternatively or additionally configured to strip flashed rich solvent 158 using flash gas 156 and/or inert gas 234. When inert gas 234 is used within inert gas system 200, inert gas 234 is channeled to inert gas system 200 from an ASU. In the exemplary embodiment, inert gas system 200 includes stripper 202 that produces stripped solvent 162 from flashed rich solvent 158, second mixer 208 that receives at least flash gas 156 and channel flash gas 156 to stripper 202, and reboiler 204 that channels vapor-liquid mixture 238 into stripper 202. Further, inert gas system 200 includes Stahl column 210 coupled in flow communication between second mixer 208 and stripper 202. Overhead gas 240 from Stahl column 210 is channeled into stripper 202 after semi-lean solvent 163 has been further concentrated into pure solvent 236 in Stahl column 210 using at least flash gas 156. Pure solvent 236 has a concentration of between approximately 99.5% by weight and approximately 99.9% by weight, and more particularly, about 99.7% by weight.

As such, a method for removing water from a gas using a solvent includes channeling wet gas 146 into absorber 104, channeling pure solvent 236 into absorber 104, and contacting pure solvent 236 and wet 146 to produce rich solvent 154 and dry gas 152. Rich solvent 154 is channeled to flash drum 110 to produce flashed rich solvent 158 and flash gas 156, and flashed rich solvent 158 is stripped and heated to produce semi-lean solvent 163. At least flash gas 156 is contacted with semi-lean solvent 163 to produce pure solvent 236. Contacting at least flash gas 156 with semi-lean solvent 163 can alternatively or additionally include contacting inert gas 234 with semi-lean solvent 163 to produce pure solvent 236. Rich solvent 154 can be heated and/or a pressure of rich solvent 154 can be reduced before rich solvent 154 is channeled into flash drum 110.

In the exemplary embodiment, contacting at least flash gas 156 with semi-lean solvent 163 includes stripping flashed rich solvent 158 using overhead 240, including at least flash gas 156, to produce stripped solvent 162. Stripped solvent 162 is heated to produce semi-lean solvent 163, and at least flash gas 156 is contacted with semi-lean solvent 163 within Stahl column 210 to produce pure solvent 236 having a concentration of at least about 99.5% by weight.

Figure 2:
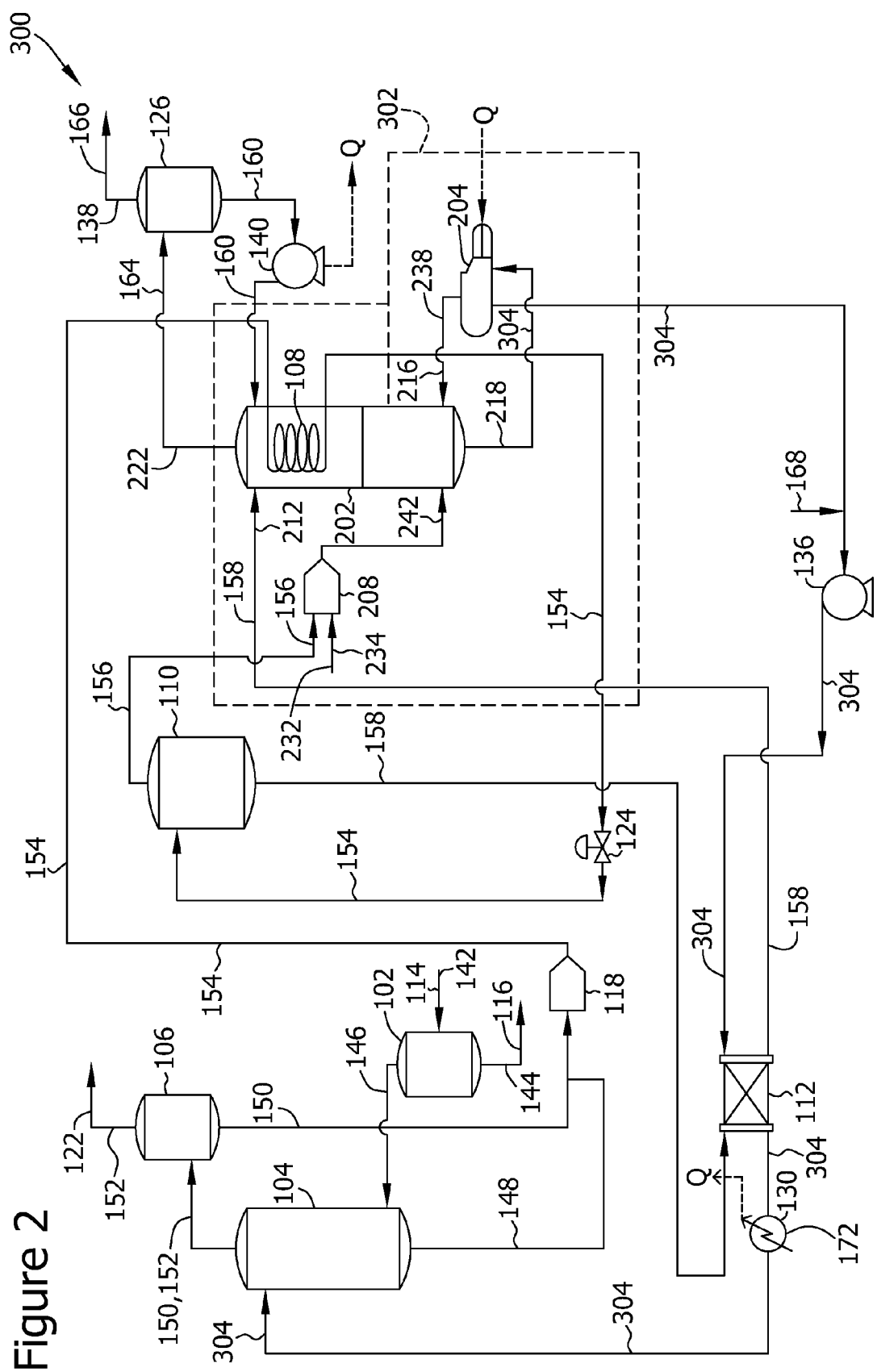
FIG. 2 is a schematic view of a first alternative dehydration system.

FIG. 2 is a schematic view of a first alternative dehydration system 300. Unless otherwise described, dehydration system 300 includes components that are similar to the components described above with reference to dehydration system 100 (shown in FIG. 1). As such, components shown in FIG. 1 are labeled with the same reference numbers used in FIG. 2. In the exemplary embodiment, dehydration system 300 includes an inert gas system 302 rather than inert gas system 200 (shown in FIG. 1). Further, unless otherwise described, inert gas system 302 includes components that are similar to the components described above with reference to inert gas system 200.

Dehydration system 300 is configured to produce between about 99.4% and about 99.6% pure solvent for re-use. In the exemplary embodiment, inert gas system 302 is similar to inert gas system 200, except inert gas system 302 does not include Stahl column 210 and second mixer 208 is coupled in flow communication with flash drum 110 and stripper 202. More specifically, in dehydration system 300, flash drum 110 separates gaseous $CO_2$ and/or steam from the liquid solvent and discharges the gaseous $CO_2$ and/or steam as flash gas 156. The liquid solvent is discharged as flashed rich solvent 158. Flash gas 156 is channeled to second mixer 208, and flashed rich solvent 158 is channeled to heat exchanger 112.

From heat exchanger 112, heated flashed rich solvent 158 is channeled to stripper 202. Vapor-liquid mixture 238, combined gas 242, and reflux 160 are channeled into stripper 202 to remove water from flashed rich solvent 158 to produce pure solvent 304. More specifically, vapor-liquid mixture 238 is channeled from reboiler 204 into stripper 202, combined gas 242 is channeled from second mixer 208 to stripper 202, and reflux 160 is channeled from vessel 126 into stripper 202. Combined gas 242 is produced by mixing inert gas 234 and flash gas 156 in second mixer 208. More specifically, flash gas 156 and inert gas 234 are channeled to second mixer 208 and combined therein before being channeled into stripper 202. Alternatively, inert gas 234 and flash gas 156 are channeled into stripper 202 without prior mixing.

In the exemplary embodiment, within stripper 202 vapor-liquid mixture 238, combined gas 242, and reflux 160 produce pure solvent 304 from heated flashed rich solvent 158. As such, stripper 202 is considered to be a contacting device. In one embodiment, pure solvent 304 is about 99.6% pure. Pure solvent 304 is discharged into reboiler 204 to be heated before being channeled to pump 136, and overhead gases 164 are discharged from stripper 202 into vessel 126. Pure solvent 304 enters solvent pump 136 where pure solvent 304 is cooled and channeled into absorber 104.

Figure 3:
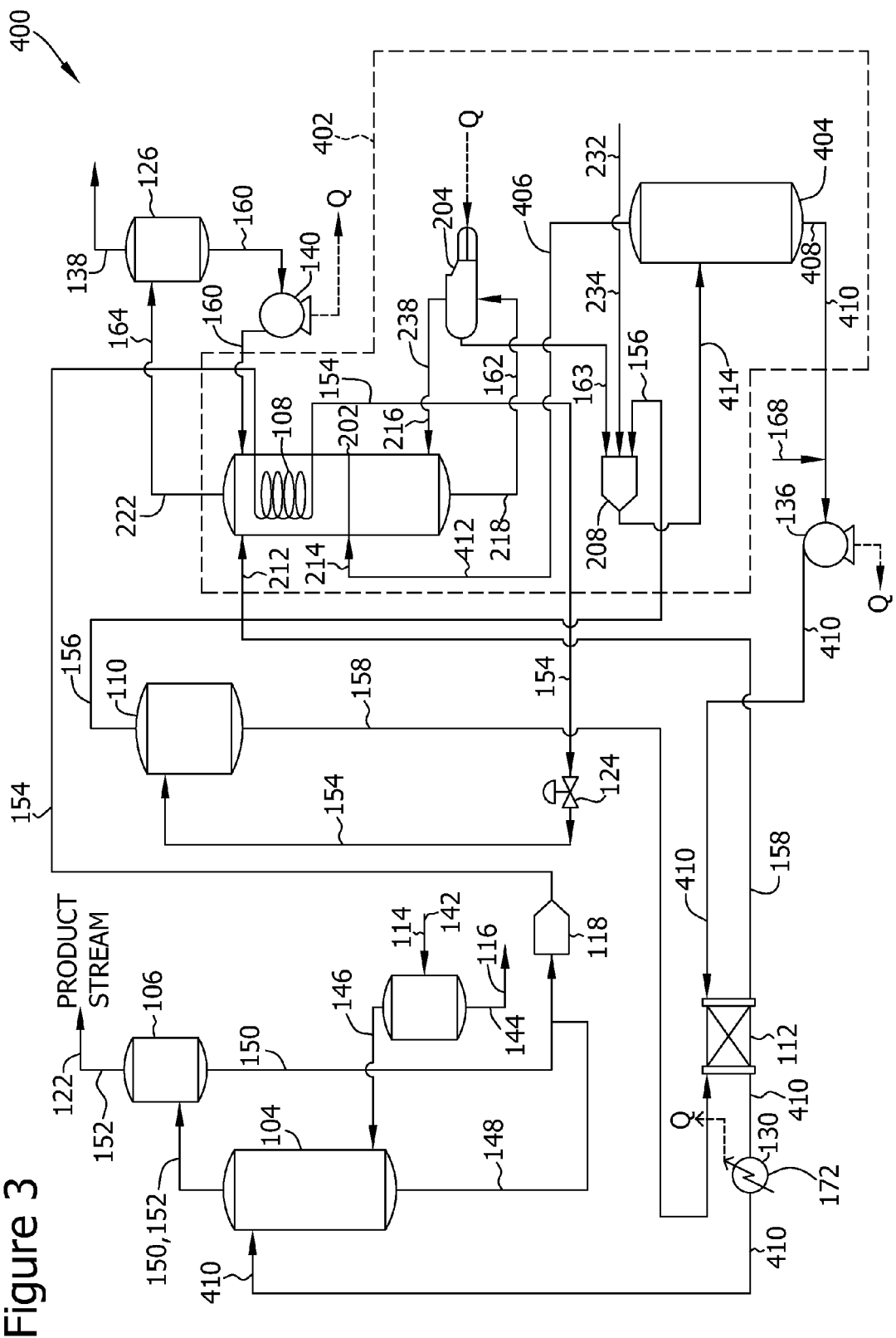
FIG. 3 is a schematic view of a second alternative dehydration system.

FIG. 3 is a schematic view of a second alternative dehydration system 400. Unless otherwise described, dehydration system 400 includes components that are similar to the components described above with reference to dehydration system 100 (shown in FIG. 1). As such, components shown in FIG. 1 are labeled with the same reference numbers in FIG. 3. In the exemplary embodiment, dehydration system 400 includes an inert gas system 402 rather than inert gas system 200 (shown in FIG. 1). Further, unless otherwise described, inert gas system 402 includes components that are similar to the components described above with reference to inert gas system 200.

Dehydration system 400 is configured to produce about 99.4% pure solvent for re-use. In the exemplary embodiment, dehydration system 400 is similar to dehydration system 100, except second mixer 208 is also in flow communication with reboiler 204. Further, an inert gas system 402 is similar to inert gas system 200, except, rather than including Stahl column 210, inert gas system 402 includes a second flash drum 404, which is considered to be a contacting device.

More specifically, reboiler 204 is coupled in flow communication with second mixer 208. Second mixer 208 is in further flow communication with flash drum 110, inert gas inlet 232, and second flash drum 404. Inert gas inlet 232 is configured to supply an inert gas 234 into second mixer 208. Alternatively, inert gas 234 is injected into reboiler 204. In the exemplary embodiment, inert gas 234 can be, without limitation, nitrogen, tail gas, and/or clean syngas. When inert gas 234 is nitrogen, inert gas 234 can be channeled to second mixer 208 from an air separation unit (ASU). At a gas outlet 406, second flash drum 404 is coupled in flow communication with stripper 202 and, at a solvent outlet 408, second flash drum 404 is coupled in flow communication with pump 136. In the exemplary embodiment, second flash drum 404 is an LP flash drum.

During operation of dehydration system 400, flash drum 110 separates gaseous $CO_2$ and/or steam from the liquid solvent and discharges the gaseous $CO_2$ and/or steam as flash gas 156. The liquid solvent is discharged as flashed rich solvent 158. Flash gas 156 is channeled to second mixer 208, and flashed rich solvent 158 is channeled to heat exchanger 112. From heat exchanger 112, heated flashed rich solvent 158 is channeled to stripper 202. Vapor-liquid mixture 238, a gas mixture 412, and reflux 160 are channeled into stripper 202 to remove water from flashed rich solvent 158 to produce stripped solvent 162. More specifically, vapor-liquid mixture 238 is channeled from reboiler 204 into stripper 202, gas mixture 412 is channeled from second flash drum 404 to stripper 202, and reflux 160 is channeled from vessel 126 into stripper 202. Vapor-liquid mixture 238, gas mixture 412, and reflux 160 produce stripped solvent 162 from heated flashed rich solvent 158. In one embodiment, stripped solvent 162 is about 99.0% pure. Stripped solvent 162 is discharged into reboiler 204 to be heated before being channeled to second mixer 208, and overhead gases 164 are discharged from stripper 202 into vessel 126. Within reboiler 204, stripped solvent 162 is heated to produce semi-lean solvent 163, which is channeled into second mixer 208.

Gas mixture 412 is produced from inert gas 234, flash gas 156, and/or steam produced from removing water from semi-lean solvent 163 within second flash drum 404. More specifically, flash gas 156, inert gas 234, and semi-lean solvent 163 are channeled to second mixer 208 and combined therein. Alternatively, inert gas 234, flash gas 156, and/or semi-lean solvent 163 are channeled into second flash drum 404 without prior mixing. In the exemplary embodiment, combined mixture 414 is channeled to second flash drum 404 where water is removed from semi-lean solvent 163 to produce pure solvent 410. In the exemplary embodiment, pure solvent 410 is about 99.4% pure. Pure solvent 410 is discharged into solvent pump 136 and channeled into absorber 104.

The above-described dehydration systems facilitate producing a higher concentration of solvent to meet dry gas specification values, as compared to known dehydration systems. More specifically, a pressure of the absorber is dependent on a compressor pressure, which is at least partially dependent on flash stage pressures in a flash drum used to dry $CO_2$. By using the systems and methods described above, the dehydration system can be run at different absorber pressures. Further, the above-described dehydration systems are more efficient than known dehydration systems because heat produced within the system is used to heat other streams within the systems. Moreover, the inert gas systems described herein facilitate minimizing inert gas usage, which generally increases as carbon capture increases. As such, the dehydration systems described herein have the ability to meet even lower water specification values for the dried $CO_2$ than are currently required. Additionally, the dehydration systems described herein enable a product stream from an absorber to be captured without adversely affecting the percentage capture of the system. As such, the value of the product stream is higher as compared to product streams that are re-used for drying a solvent.

Exemplary embodiments of dehydration systems and methods for removing water from a gas are described above in detail. The methods and systems are not limited to the specific embodiments described herein, but rather, components of systems and/or steps of the methods may be utilized independently and separately from other components and/or steps described herein. For example, the methods may also be used in combination with other dehydration systems and methods, and are not limited to practice with only the integrated gasification combined cycle systems and methods as described herein. Rather, the exemplary embodiment can be implemented and utilized in connection with many other dehydration applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A dehydration system comprising:
    an absorber receiving an input stream of wet gas and an input stream of solvent, said absorber producing an overhead stream of carry-over solvent and dry gas and a stream of wet solvent;
    a knock-out drum receiving the stream of carry-over solvent and dry gas, said knock-out drum producing a dry gas stream and a carry-over solvent stream;
    a reflux coil receiving the stream of wet solvent and the carry-over solvent stream, the stream of wet solvent and the carry-over solvent stream forming a rich solvent stream;
    a flash drum fluidly coupled to said reflux coil to receive the rich solvent stream, said flash drum producing a flash gas stream and a flashed rich solvent stream;
    a column receiving the flash gas stream and an input stream of inert gas, said column producing a first overhead stream and a pure-solvent stream;
    a stripper receiving the flashed rich solvent stream and the first overhead stream, said stripper producing a second overhead stream and a stream of stripped solvent; and
    a reboiler receiving the stream of stripped solvent, said reboiler producing a vapor-liquid stream in flow communication with said stripper and a semi-lean solvent stream in flow communication with said column, wherein said stripper and said column are configured to strip the flashed rich solvent stream with the flash gas stream and the input stream of inert gas to produce the pure solvent stream.

2. A dehydration system in accordance with claim 1, wherein said input stream of wet gas is a wet CO2 gas, and said flash gas stream is a CO2 rich stream.

3. A dehydration system in accordance with claim 1, further comprising an air separation unit coupled in flow communication to said column, said air separation unit producing the input stream of inert gas.

4. A dehydration system in accordance with claim 1, wherein said reflux coil is located within said stripper.

5. A dehydration system in accordance with claim 1, further comprising a mixer configured to receive the flash gas stream and the input stream of inert gas and channel the flash gas stream and the inert gas stream to the column, wherein the column is configured to supply the flash gas stream and the inert gas stream to the stripper after the semi-lean solvent has been concentrated into the pure solvent using the flash gas stream and the inert gas stream, the pure solvent having a concentration of between approximately 99.5% by weight and approximately 99.9% by weight.

6. A dehydration system in accordance with claim 5, wherein the column comprises a vessel, the pure solvent discharged from the column passing through the vessel to exchange heat with at least the flash gas stream.

7. A dehydration system in accordance with claim 1 further comprising a pressure control device coupled in flow communication between the absorber and the flash drum, the pressure control device configured to reduce a pressure of the rich solvent stream before the rich solvent is channeled to the flash drum.

8. A dehydration system in accordance with claim 1 further comprising a heat exchanger configured to heat the rich solvent stream using the pure solvent stream.

* * * * *